US008935390B2

(12) United States Patent
Mirandette et al.

(10) Patent No.: US 8,935,390 B2
(45) Date of Patent: Jan. 13, 2015

(54) METHOD AND SYSTEM FOR EFFICIENT AND EXHAUSTIVE URL CATEGORIZATION

(75) Inventors: Olivier Mirandette, Montreal (CA); Marc Tremblay, Montreal (CA); Eric Melin, Montreal (CA)

(73) Assignee: Guavus, Inc., San Mateo, CA (US)

( * ) Notice: Subject to any disclaimer, the term of this patent is extended or adjusted under 35 U.S.C. 154(b) by 24 days.

(21) Appl. No.: 13/515,079

(22) PCT Filed: Dec. 8, 2010

(86) PCT No.: PCT/CA2010/001952
§ 371 (c)(1),
(2), (4) Date: Jun. 26, 2012

(87) PCT Pub. No.: WO2011/069255
PCT Pub. Date: Jun. 16, 2011

(65) Prior Publication Data
US 2012/0271941 A1 Oct. 25, 2012

Related U.S. Application Data

(60) Provisional application No. 61/285,604, filed on Dec. 11, 2009.

(51) Int. Cl.
*G06F 15/173* (2006.01)
*H04L 29/08* (2006.01)
*G06F 17/30* (2006.01)
(52) U.S. Cl.
CPC .......... *H04L 67/22* (2013.01); *G06F 17/30876* (2013.01)
USPC ......................................... 709/224; 709/223

(58) Field of Classification Search
USPC .................................................. 709/223, 224
See application file for complete search history.

(56) References Cited

U.S. PATENT DOCUMENTS 7,421,498 B2 9/2008 Packer
7,590,716 B2 9/2009 Sinclair et al.
(Continued)

FOREIGN PATENT DOCUMENTS

WO 2008124947 10/2008

OTHER PUBLICATIONS

Zhang, J. et al., "The Role of URLs in Objectionable Web Content Categorization", Proceedings of the 2006 IEEE/WIC/ACM International Conference on Web Intelligence WI'06, Hong Kong.
(Continued)

*Primary Examiner* — Edward Kim
(74) *Attorney, Agent, or Firm* — Morgan, Lewis & Bockius LLP

(57) ABSTRACT

The present method and system relate to categorizing URLs (Uniform Resource Locators) of web pages accessed by multiple users over an IP (Internet Protocol) based data network. The method and system collect real time data from IP data traffic occurring on the IP based data network, and extract parameters from the collected real time data, the parameters including an URL of a web page. The URL is processed by a rule based categorization engine, to associate a matching category to the URL of the web page. When no matching category is inferred, the URL is transferred to a semantic based categorization engine. A matching category is associated to the transferred URL by the semantic based categorization engine, based on a semantic analysis of the textual content extracted from the web page associated to the URL.

14 Claims, 4 Drawing Sheets

(56) References Cited

U.S. PATENT DOCUMENTS

| | | | |
|---|---|---|---|
| 7,693,863 B2* | 4/2010 | Martin et al. | 707/603 |
| 2001/0025275 A1* | 9/2001 | Tanaka et al. | 705/412 |
| 2001/0032258 A1* | 10/2001 | Ishida et al. | 709/224 |
| 2003/0046311 A1* | 3/2003 | Baidya et al. | 707/200 |
| 2003/0110168 A1* | 6/2003 | Kester et al. | 707/6 |
| 2006/0253594 A1* | 11/2006 | Szabo et al. | 709/227 |
| 2007/0081471 A1 | 4/2007 | Taller, Jr. et al. | |
| 2007/0143439 A1* | 6/2007 | Szabo et al. | 709/217 |
| 2008/0040389 A1 | 2/2008 | Seth et al. | |
| 2008/0162448 A1 | 7/2008 | Jalan | |
| 2008/0189307 A1 | 8/2008 | Sankaran et al. | |
| 2008/0209057 A1 | 8/2008 | Martini et al. | |
| 2009/0182818 A1* | 7/2009 | Krywaniuk | 709/206 |
| 2009/0234876 A1* | 9/2009 | Schigel et al. | 707/102 |
| 2009/0240638 A1 | 9/2009 | Kirpal et al. | |

OTHER PUBLICATIONS

Kan, M. et al., "Fast Webpage Classification Using URL Features", Proceedings of ACM Fourteenth Conference on Information and Knowledge Management CIKM'O5, Bremen, Germany.

Li, C. et al., "Classifier-Guided Topical Crawler: A Novel Method of Automatically Labeling the Positive URLs", Proceedings of the Fifth International Conference on Semantics, Knowledge and Grid, SKG 2009, Zhuhai, China.

\* cited by examiner

US 8,935,390 B2

METHOD AND SYSTEM FOR EFFICIENT AND EXHAUSTIVE URL CATEGORIZATION

SUMMARY

A method and system are disclosed to categorize URLs (Uniform Resource Locators) of web pages accessed by multiple users over an IP (Internet Protocol) based data network. The method and system collect, by means of at least one monitoring probe, real time data from IP data traffic occurring on the IP based data network, and extract parameters from the collected real time data, the parameters including an URL of a web page. The URL is processed by a rule based categorization engine, to associate a matching category to the URL of the web page. When no matching category is inferred, the URL is transferred to a semantic based categorization engine. A matching category is associated to the transferred URL by the semantic based categorization engine, based on a semantic analysis of the textual content extracted from the web page associated to the URL.

Additionally, a method and system are disclosed, wherein the matching category associated to a transferred URL by the semantic based categorization engine is transferred back to the rule based categorization engine. A set of text based rules of the rule based categorization engine is automatically updated, in order to acquire the capability to associate the matching category to the transferred URL.

Also, a method and system are disclosed, wherein the URLs for which no matching category has been inferred by the rule based categorization engine over a determined period of time are memorized; and only the N URLs with the highest occurrence over the determined period of time are transferred to the semantic based categorization engine; where N is a pre-defined number of URLs.

And, a method and system are disclosed, wherein additional parameters related to an access to a web page are extracted, by the at least one monitoring probe, from the collected real time data. An analysis from a Business Intelligence perspective of the matching categories associated to the URLs is performed by an analytic system; the analysis taking into consideration the additional parameters.

DETAILED DESCRIPTION

Figure 1:
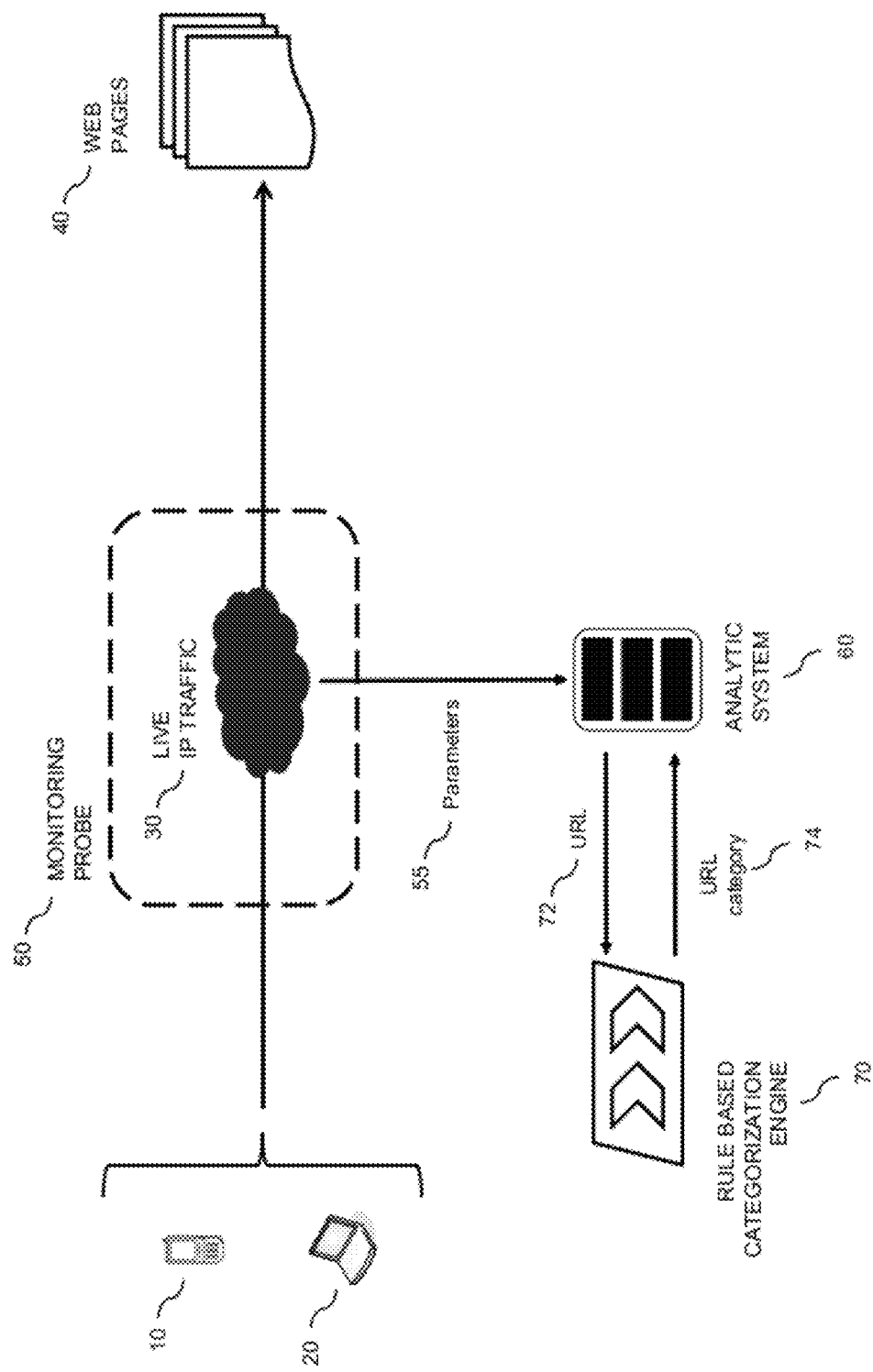
FIG. 1 illustrates a rule based URL categorization engine, according to a non-restrictive illustrative embodiment.

Nowadays, subscribers of IP based data networks, including fixed broadband networks and mobile networks, have access to a multitude of web sites. On the other hand, fixed and mobile service providers have an increasing need to understand their subscriber's habits and behaviours, in terms of consumption of IP based data services, to identify means to differentiate from the competition. For this purpose, various tools are used to analyze these IP based data services. In the specific case of web sites, the extreme diversity of available web pages complicates this analysis. One means to address this complexity is to classify the web pages among a pre-defined list of categories, and to perform the analysis from the perspective of these categories, rather than from the perspective of the web pages themselves.

One technology to classify web pages consists in using a set of rules to associate the Uniform Resource Locator (URL) of a web page to one among a pre-defined list of categories. This type of technology, referred to as a rule based categorization engine, is usually effective in terms of performance, but does not scale easily to the diversity of available web sites and pages. It can only categorize a limited subset of web pages (those covered by the set of rules), and needs manual upgrade to extend its set of rules.

Therefore, there is a need for overcoming the above discussed limitations of web page categorization using a rule based URL categorization engine, with respect to the lack of exhaustivity of the coverage and the lack of automation of the extension of the coverage. An object of the present is therefore to provide a method and system for efficient and exhaustive URL categorization.

In a general embodiment, the present method is adapted for categorizing URLs of web pages accessed by users over an IP (Internet Protocol) based data network. For doing so, the method collects, by means of at least one monitoring probe, real time data from IP data traffic occurring on the IP based data network; and extracts from the collected real time data parameters related to a web page, the parameters including an URL of the web page. Then, the method processes the URL with a rule based categorization engine, to associate a matching category to the URL of the web page; the matching category being inferred from a pre-defined list of categories. When no matching category is inferred, the method transfers the URL of the web page to a semantic based categorization engine. Then, the method processes the transferred URL with the semantic based categorization engine. The processing consists in: extracting textual content from the web page associated to the URL; performing a semantic analysis of the textual content; and associating a matching category to the transferred URL of the web page based on the semantic analysis of the textual content extracted from the web page, the matching category being inferred from a pre-defined list of categories.

In another general embodiment, the present system is adapted for categorizing URLs of web pages accessed by users over an IP based data network. For doing so, the system comprises at least one monitoring probe, for collecting real time data from IP data traffic occurring on the IP based data network; and for extracting from the collected real time data parameters related to a web page, the parameters including an URL of the web page. The system also comprises a rule based categorization engine for processing the URL, and to associate a matching category to the URL of the web page, the matching category being inferred from a pre-defined list of categories. The system further comprises a semantic based categorization engine, for further processing the URL of the web page, when no matching category is inferred by the rule based categorization engine. The further processing consists in: extracting textual content from the web page associated to the URL; performing a semantic analysis of the textual content; and associating a matching category to the URL of the web page based on the semantic analysis of the textual content extracted from the web page, the matching category being inferred from a pre-defined list of categories.

In an additional embodiment of the present method and system, a complementary mechanism is implemented as follows: the matching category associated to a transferred URL by the semantic based categorization engine is transferred back to the rule based categorization engine; and a set of text based rules of the rule based categorization engine is automatically updated to acquire the capability to associate the matching category to the transferred URL.

In another additional embodiment of the present method and system, a complementary mechanism is implemented, to memorize the URLs which cannot be categorized by the rule based categorization engine, and to transmit at regular intervals only a subset of these URLs to the semantic based categorization engine. The subset consists of a pre-defined number of URLs, which have the highest occurrence on the data network, and cannot be categorized by the rule based categorization engine.

Referring now to FIG. 1, a rule based URL categorization engine will be described.

The context of FIG. 1 is an IP based data network offering IP based data services to end users. This network may be a fixed broadband network relying on a variety of access technologies, including cable, DSL (Digital Subscriber Line), fiber optic. Alternatively, the network may be a mobile network, for instance a cellular network or a WIMAX (Worldwide Interoperability for Microwave Access) network, or a combination of both fixed broadband and mobile networks.

Subscribers use various types of devices to access data services via the IP based data network. Mobile devices 10 (e.g. mobile phones, tablets, etc) or computers 20 (e.g. fixed like a Personal Computer (PC), nomadic like a laptop, etc) represent usual examples of such devices. Among the various types of available data services, web browsing represents a significant part of the activities of the subscribers. The web pages 40 accessed during the web browsing sessions may be part of a dedicated web portal belonging to the network Operator, or may alternatively be part of the Internet at large.

Network Operators are increasingly interested in measuring and analyzing the activities of their subscribers in terms of IP based data services consumption. In a first scenario, the network Operator makes use of this information directly, to develop targeted value added services offerings or to customize its data plan offerings. In a second scenario, the network Operator shares this information with third party content providers to adapt the content offerings. In a third scenario, the network Operator shares this information with on-line advertising companies, to generate personalized advertisements targeting clusters of subscribers with similar interests, or even targeting individual subscribers. Other scenarios based on the ecosystem involving network Operators, content providers, and advertisers may be generated at will.

In the context of the present method and system, measuring and analyzing the subscriber's activities related to web browsing consists in monitoring the web pages 40 accessed by the subscribers of the Operator, and assigning a category to each of these web pages. The category is selected among a pre-defined list of categories representing the diversity of the contents hosted on Internet web pages. Examples of such categories include, among others: sports, news, finance, music and video . . . . A hierarchy of categories can be built to better represent the variety of thematic available on the Internet. For instance, sports may be divided into the sub-categories soccer, tennis, swimming . . . . Although there is no limitation on the number of layers in the hierarchy of categories, a main category and a single sub-category is considered effective in terms of classification. Based on the previous examples, a web page is allocated the category sport/tennis when its content is more closely related to this specific category.

A classification of the web pages accessed by subscribers based on a limited number of categories/sub-categories is a practical source of information to analyze the trends and behaviors of these subscribers related to web browsing. From a business analyst perspective, it is complicated to deal with statistics directly related to the URLs of the web pages accessed by subscribers, since there is almost infinity of such URLs. Grouping these URLs within a limited list of categories (typically a few dozen categories, possibly organized in main and sub categories) reduces the size of the data to be analyzed to a size that is manageable from a human being perspective.

The different steps involved in the aforementioned method are the following: capturing the URLs of the web pages accessed by the subscribers in real time. Then, assigning a category to each URL. And finally, performing an analysis from a Business Intelligence perspective on metrics associated to the categories (e.g. analyzing the percentage of web pages viewed for each category).

Figure 4:
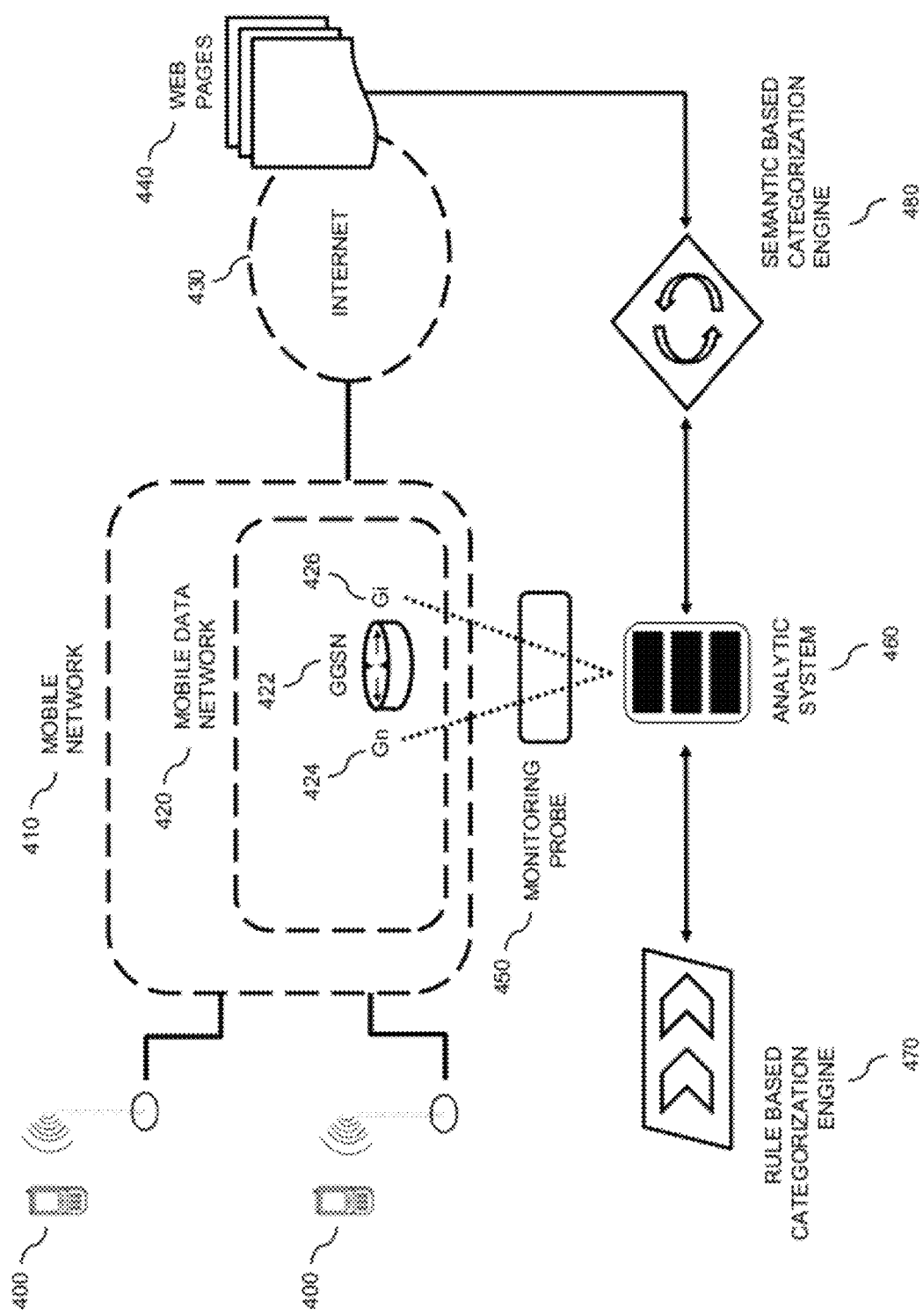
FIG. 4 illustrates a system for efficient and exhaustive URL categorization in the context of a mobile network, according to a non-restrictive illustrative embodiment.

The real time capture of the URLs of the web pages 40 accessed by the subscribers relies on a monitoring probe 50, based for example on DPI (Deep Packet Inspection). The DPI technology is well known in the art for allowing the real time capture of live IP traffic 30, and for allowing the processing of the captured traffic along various layers of the OSI (Open System Interconnection) model to extract relevant information. The capture of the live IP traffic 30 is performed at one or several carefully selected location(s) in the IP based data network infrastructure of the Operator. FIG. 4 will illustrate this point of capture in the case of a cellular network.

The monitoring probe 50 has the capability to identify the IP based data traffic corresponding to an access to a specific web page by a subscriber, and to extract the URL corresponding to this web page. For this purpose, the DPI based monitoring probe identifies the protocol used for web browsing: HTTP (Hyper Text Transfer Protocol). It then extracts the URL of a specific web page from the HTTP layer of the IP packets exchanged during the corresponding web browsing session. Additional parameters are also collected by the DPI based monitoring probe 50, to add contextual information to the URLs. For instance, timestamps are added to record the time at which a web page has been accessed. Additionally, a unique identifier of the specific subscriber (or alternatively, a unique identifier of the device 10 or 20 used by this specific subscriber) who accessed a web page is extracted from the live IP traffic 30. This type of information is useful to count the number of unique subscribers who accessed a web page (or a category in the context of the present method and system). Associating a unique identifier of a subscriber to a specific IP data flow corresponding to a web browsing session of this subscriber is usually not trivial. However, this type of association has been described in details in the art related to DPI technology, and is also technically feasible. For example, in the case of an UMTS network, a unique identifier of the subscriber is the International Mobile Subscriber Identity (IMSI) or the Mobile Subscriber ISDN (MSISDN). Both the IMSI and MSISDN are extracted from UMTS specific IP based control traffic, and associated to a specific data session including HTTP based IP traffic.

The parameters 55 extracted by the monitoring probe 50 are transmitted to an analytic system 60. These parameters include the URLs of all the web pages 40 accessed via the Operator data network, along with additional contextual information (like for example the timestamps and the subscriber's unique identifiers mentioned previously). From an operational point of view, the transmission usually occurs at regular intervals: for example, every fifteen minutes, or every hour, or every day. The interval depends on the capabilities and performances of the monitoring probe 50, and of the analytic system 60.

The analytic system 60 usually includes a high performance database (not shown) to store the parameters transmitted by the monitoring probe 50. The parameters 55 are transformed and mapped to an optimized data model for efficient storage. The analytic system 60 also includes a dedicated analytic engine, to perform Business Intelligence oriented processing of the stored data. For instance, historic data over a period of reference are used to track trends and behaviors related to subscriber's consumption of IP based data services. Thus, although the present method and system focuses on web browsing analytics and categorization of the associated URLs, the analytic system 60 is capable of analyzing different types of data services. And the parameters 55 transmitted by the monitoring probe 50 include information related to these various types of data services. However, in the following, we will focus on web browsing analytics and URL categorization.

Each URL 72 received by the analytic system 60, as part of the parameters 55 transmitted by the monitoring probe 50, is transferred to the rule based categorization engine 70. The engine uses an optimized algorithm to associate a category to the URL, chosen among a list of pre-defined categories. The URL category 74 is transferred back to the analytic system 60. Then, the fact that a web page 40 corresponding to the URL 72 has been accessed is recorded in the analytic system (usually in a high performance database as already mentioned) as follows: the URL category 74 is recorded, along with contextual parameters such as the timestamp and a unique identifier for the subscriber who accessed the web page. Optionally, the full URL 72 may be memorized as well.

A URL is composed of a host, a path, a file and optional parameters (in the form of key/value pairs). The host represents an entire web site belonging to an organization. The path represents the localization of a specific web page in the web site. The file represents the name of a file where the content of a web page is stored. The optional parameters allow interactions with the referenced web page. For instance, the web page www.yahoo.ca/sports/tennis/coupe_rogers/results.html is broken down as follows: www.yahoo.ca is the host, sports/tennis/coupe_rogers is the path, and results.html is the file. A single web site, represented by its host, may include diversified content belonging to several categories. For example, the web page www.yahoo.ca/sports/tennis/coupe_rogers/results.html could be associated to the category sport/tennis. While the web page www.yahoo.ca/news/tsx.html could be associated to the category finance/stock markets. Thus, viewing of these two web pages is memorized in the analytic system 60 as viewing content from the categories sport/tennis and finance/stock markets, respectively.

The fact that the full URLs are not memorized and analyzed by the analytic system 60 does not prevent the hosts (for instance www.yahoo.ca in the previous example) to be recorded and analyzed. In this case, web page analytics is performed using the categories associated to the URLs of the web pages, and web site analytics may be performed using the hosts associated to the web sites.

Another point is the localization of the rule based categorization engine 70. In FIG. 1, it has been represented as a standalone entity interfacing with the analytic system 60. Other configurations are possible without changing the scope of the present method and system. Among others, the rule based categorization engine may be integrated to either the monitoring probe 50 or to the analytic system 60.

Regarding the rule based categorization engine 70, it relies on a rule engine, which is a technology well known in the art of artificial intelligence. A possible embodiment of a rule engine in the context of the present method and system is described as follows. Text based rules are included in an input file. Each line in the input file represents a text based rule and consists of a single URL or an aggregation of URLs, followed by the associated category. Aggregation of URLs is represented using specific symbols. For example, the symbol * can be used as an aggregator as follows: www.yahoo.ca/sports/* means every URL starting with www.yahoo.ca/sports/. In another example, the symbols * and - can be used as aggregators as follows: www.yahoo.ca/sports/*-/tennis/ means every URL starting with www.yahoo.ca/sports/ except those starting with www.yahoo.ca/sports/tennis. The aggregation rules for the URLs allow for the allocation of a category to multiple web pages via a single line in the input file.

The input file is interpreted by the rule engine 70 and converted to metadata in a format specific to the rule engine. The rule engine 70 consists in software instructions executed on either a standard or a dedicated hardware platform. When presented with a URL, the rule engine 70 executes the software instructions to interpret the metadata in order to find the associated category. The format of the metadata and the set of software instructions are both optimized, in order to find the category associated to a URL in a minimum amount of time. In particular, all the information contained in the text based rules of the input file is present in the metadata, but represented in a format that is efficiently interpreted by the software instructions.

Alternatively, instead of interpreting the URLs as a whole, the rule based categorization engine 70 may interpret a combination of the hosts, paths and files that constitute the URLs. In particular, this may allow a better granularity and flexibility in the definition of the text based rules in the input file.

The main advantage of using a rule engine 70 for the categorization of the URLs is that it relies on optimized mechanisms that improve the performances of the categorization process, compared to alternative technologies. The main drawback is that the effective range of URLs that can be categorized is limited to the set of text based rules defined in the input file: only the URLs represented by the text based rules can be categorized. The aggregation rules allow for the representation of a large number of URLs via a single rule, but still, the variety of existing URLs (for instance considering the whole Internet) is so large, that only a subset of these existing URLs can be categorized via this mechanism. Another drawback is that the list of available rules is static by nature, preventing the implementation of a dynamic mechanism to automatically upgrade the list of rules to follow the evolution of the web pages 40 accessed by subscribers.

Thus, there is a need to improve the mechanisms represented in FIG. 1, so that the URLs that cannot be categorized by the rule based categorization engine 70 are categorized via a complementary tool, and then automatically added to the input file of the rule based categorization engine in the form of new text based rules, to improve the coverage of the rule based categorization engine 70 over time.

Figure 2:
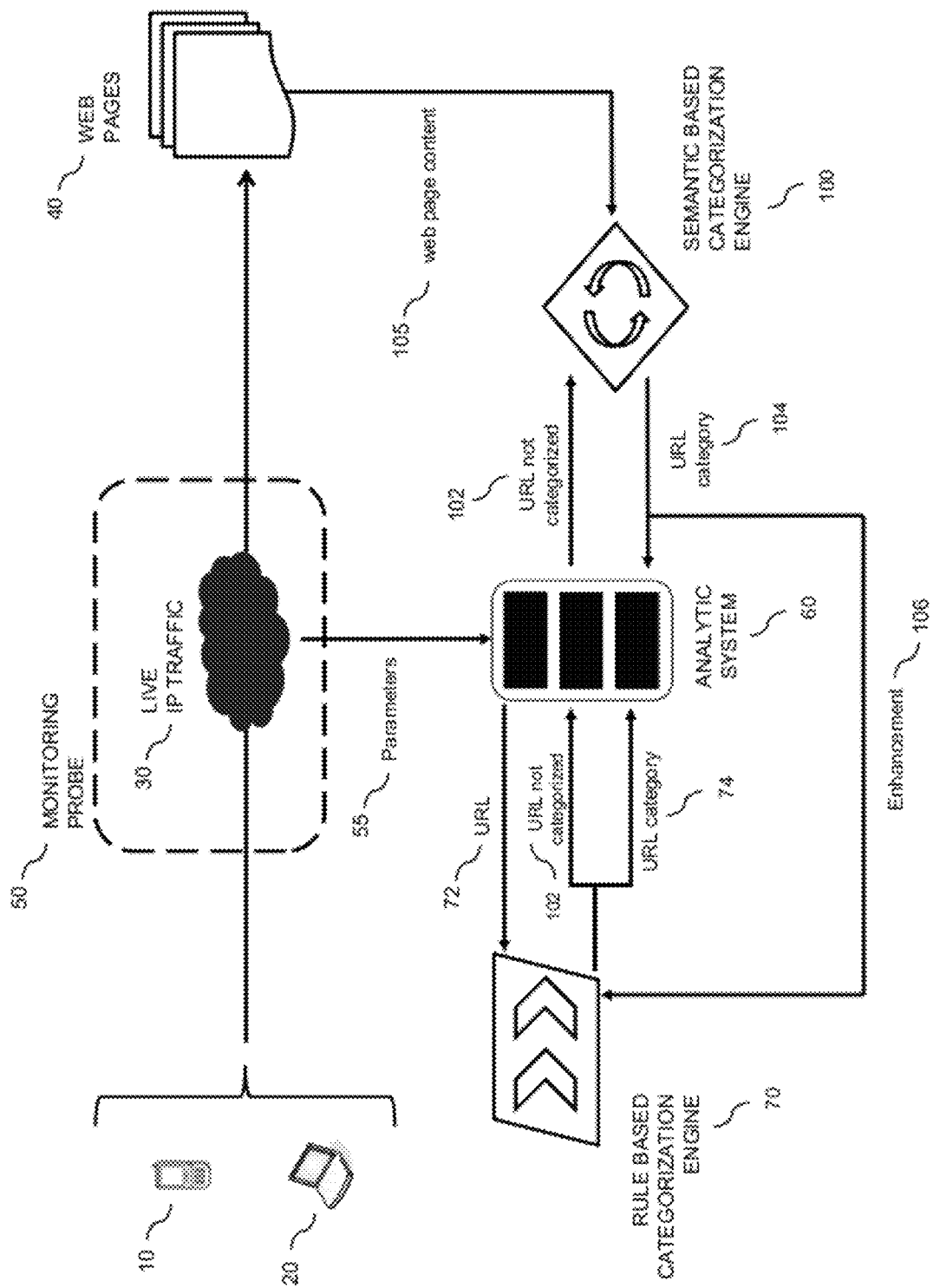
FIG. 2 illustrates a system for efficient and exhaustive URL categorization, according to a non-restrictive illustrative embodiment.
Figure 3:
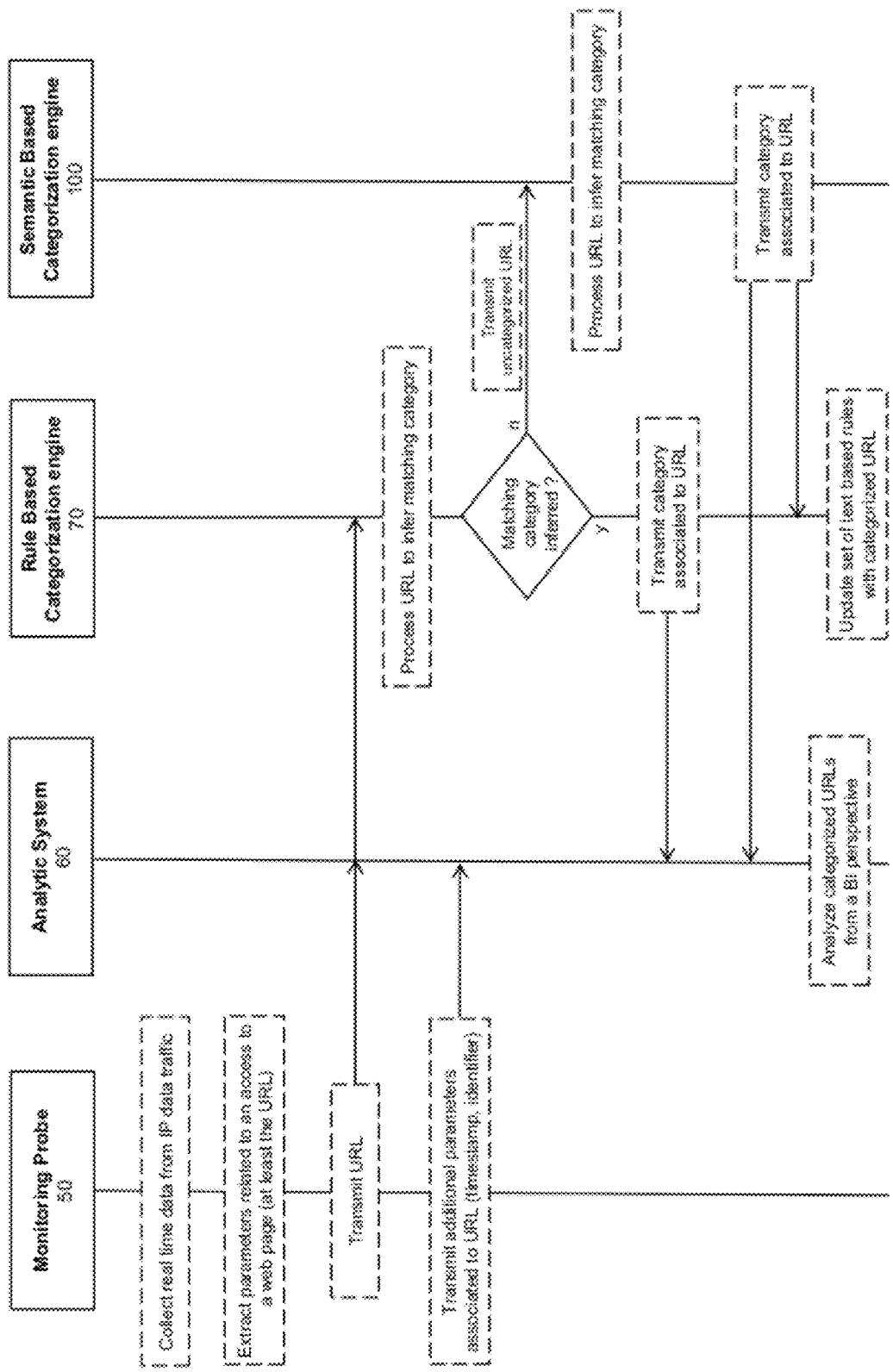
FIG. 3 illustrates a method for efficient and exhaustive URL categorization, according to a non-restrictive illustrative embodiment.

Referring now concurrently to FIGS. 2 and 3, a method and system for efficient and exhaustive URL categorization will be described.

The mechanisms described in FIG. 1, related to the interactions between the monitoring probe 50, the analytic system 60, and the rule based categorization engine 70, are applicable to FIG. 2.

When a URL 72 submitted to the rule based categorization engine 70 cannot be assigned a category (because this URL is not covered by the list of rules of the rule based categorization engine), instead of a URL category 74, an indicator that no matching category has been found is returned to the analytic system 60. The URL that has not been recognized 102 (a copy of URL 72) is then submitted to a semantic based categorization engine 100.

The semantic based categorization engine 100 retrieves the web page content 105 of the URL 102 associated to the web page 40, and extracts the textual content from the web page content 105 (web pages usually also contain multimedia content in the form of images, videos, etc; which are not exploited by the present method and system). For this purpose, the semantic based categorization engine 100 connects to the related web site, downloads the web page 40 corresponding to the URL 102, and performs the extraction of the textual content from the web page content.

Then, the semantic based categorization engine 100 performs a semantic analysis of the textual content, and infers the best matching category for this textual content. The category is selected among a pre-defined list of categories; preferably the same list that is used by the rule based categorization engine 70.

The semantic based categorization engine 100 is a technology well known in the art of artificial intelligence. A semantic based categorization engine has the capability to analyze a text from a semantic perspective, to recognize specific patterns and associate a meaning to these patterns. A critical component of the semantic based categorization engine 100 is the ontology: it is the metadata that contains the background knowledge and the rules necessary to perform the semantic based interpretation of the text. The following describes how the semantic based categorization engine is trained and becomes operational.

In a first phase, the ontology is created and the semantic based categorization engine is trained with a sample population, to learn to associate a textual input with the proper output (usually an interpretation or categorization of the textual input). When the training process is completed, the semantic based categorization engine 100 is capable of determining the proper output when presented with any new textual input. Additionally, a percentage of confidence can also be provided, representing the level of confidence that the inferred output is the best matching one for the submitted textual input. The training process of the semantic based categorization engine 100 usually relies on one among a variety of Artificial Intelligence technologies.

In the context of the present method and system, the training period consists first in generating the appropriate ontology, which is closely related to the pre-defined list of URL categories. Then, it consists in training the semantic based categorization engine 100 with a selection of URLs for each pre-defined URL category. The URLs are carefully selected by a specialized staff, including linguists, based on criteria granting the relevance of the textual content associated to an URL with the matching URL category. The semantic based categorization engine 100 is trained to associate the textual content of the URLs of the training sample with their matching URL categories.

When the training period is completed, a validation phase is performed. A new sample of URLs is selected, for which the category is known in advance. The sample of URLs is presented to the semantic based categorization engine 100, and the inferred category for each URL is compared with the expected result. A fine tuning of the semantic based categorization engine 100 is performed when inaccurate URL categorization occurs. The validation sample is carefully selected by the specialized staff, to assess the robustness of the semantic based categorization process. For example, ambiguous textual content that may be interpreted as belonging to more than a single URL category is selected on purpose, to validate that the expected URL category is selected by the semantic based categorization engine 100.

In the operational phase, the URL category 104 inferred by the semantic based categorization engine 100 is transmitted to the analytic system 60. This URL category is exploited by the analytic system 60 in a similar manner as the one described in the context of FIG. 1, for the URL categories 74 transmitted by the rule based categorization engine 70.

Additionally, the URL category 104 is transmitted to the rule based categorization engine 70, as part of an enhancement process 106 of the categorization capabilities of the rule based categorization engine 70. Specifically, a new text based rule for the URL 102 and its URL category 104 is created in the input file of the rule based categorization engine 70. Thus, the rule based categorization engine 70 acquires the capability to categorize the URL 102 with the proper URL category 104. For optimization purposes, instead of creating a new rule, an existing rule may be modified when applicable, to add the capability to categorize the URL 102 to the existing rule.

One important issue to take into consideration is that the semantic based categorization engine 100 has a limited capacity in terms of the range of URLs that it is capable of categorizing in a fixed amount of time. A reasonable order of magnitude with existing technologies (including standard hardware platforms) allows for the categorization of the textual content of a few web pages per second. Increasing the web page categorization capacity means significantly increasing the underlying hardware platform capacity. This may have a prohibitive effect on the cost and scalability. Thus, it may not be reasonable to transmit all the URLs 102 that have not been categorized by the rule based categorization engine 70 to the semantic based categorization engine 100. The following mechanism is implemented to address this issue.

Over a given period of time (for example every hour or every day), all the URLs that are not categorized by the rule based categorization engine 70 are memorized and counted. This mechanism of memorizing and counting may be implemented in the analytic system 60. Then, the top N (for example top 100 or top 1000) URLs not categorized 102 over the considered period of time are transmitted to the semantic based categorization engine 100. Finally, the enhancement process 106 is applied as described previously. With this mechanism, the rule based categorization engine 70 acquires the capacity to categorize 100 (or 1000) new critical URLs every hour (or day).

Regarding the localization of the semantic based categorization engine 100, the same considerations apply as for the rule based categorization engine 70. In FIG. 2, it has been represented as a standalone entity interfacing with the analytic system 60. Other configurations are possible without changing the scope of the present method and system. Among others, the rule based categorization engine may be integrated to the analytic system 60 or may be integrated with the rule based categorization engine 70.

In the embodiment of the system represented on FIG. 2, a semantic based categorization engine 100 has been used. However, an alternative Artificial Intelligence based technology can be used without changing the scope of the present method and system. The only constraint on the Artificial Intelligence based technology is its capability to categorize any URL with a high percentage of accuracy. As already mentioned, the extensive coverage in terms of URL categorization has a cost in terms of performances. Thus, such a technology is a complement of the high performance rule based categorization engine 70, and cannot replace it.

Referring now to FIG. 4, a system for efficient and exhaustive URL categorization in the context of a mobile network will be described.

A mobile network 410 is considered in FIG. 4. Examples of such mobile networks include cellular networks implementing one of the following standards: Universal Mobile Telecommunication System (UMTS), Code Division Multiple Access (CDMA), LTE (Long Term Evolution). Worldwide Interoperability for Microwave Access (WIMAX) networks are another type of mobile networks that are also relevant to the present method and system.

The mobile network 410 comprises a mobile data network 420, to transport the data traffic generated by the data services provided by the mobile Operator. Such data services consist, among others, in web browsing, messaging, multimedia delivery, on-line gaming, and business applications. The Internet Protocol is the underlying networking protocol used in mobile data networks, in the case of any type of cellular network, as well as for WIMAX networks.

The mobile data network 420 is the interface between the mobile subscribers engaged in a data session, represented by their mobile devices 400, and external networks, like the Internet 430. Any IP based data session in which a mobile device 400 is engaged, goes through the mobile data network 420. Different types of external networks can be accessed via the mobile data network 420: the Internet 430, an ISP network (not represented in FIG. 4), and also services and applications network infrastructures operated by the Mobile Operator (not represented in FIG. 4), like the IP Multimedia Subsystem (IMS).

More specifically, FIG. 4 represents a Universal Mobile Telecommunication System (UMTS) network, as an example of a mobile network. The Gateway GPRS Support Node (GGSN) 422 is a key equipment for the transport of the IP data traffic in the UMTS mobile data network 420. The GGSN 422 is connected through its Gi interface 426 to the external networks, including the Internet 430. It is connected through its Gn interface 424 to the rest of the UMTS packet switched core network. The packet switched core network is the name of the mobile data network 420 for a UMTS network.

As represented in FIG. 4, a monitoring probe 450 uses the Gn interface 424, or the Gi interface 426, as a point of capture for the IP data traffic circulating in the mobile data network 420. The role of the monitoring probe 450 is to extract relevant parameters from the IP data traffic (using DPI technologies), and to transmit these parameters to the analytics system 460. Although the Gn interface 424 and Gi interface 426 are shown as the points of capture for the IP data traffic circulating in the mobile data network 420, other points of capture could alternately be selected.

The parameters include the URLs of the web pages 440 accessed from the mobile devices 400 of the subscribers through the mobile data network 420. The rule based categorization engine 470 and the semantic based categorization engine 480 implement the mechanisms described previously (and represented in FIGS. 1, 2, and 3), to perform the categorization of the URLs received by the analytic system 460. As mentioned before, the categorized URLs, in conjunction with other parameters (timestamps, unique identifiers of the subscribers accessing the URLs) transmitted by the monitoring probe 450, are analyzed by the analytic system 460 from a Business Intelligence perspective. This type of analysis is known in the art as web analytics. For example, the following metrics may be calculated by the analytic system 460: total number of accesses to web pages which URLs have been associated to a specific URL category, over a determined period of time; total number of unique subscribers accessing web pages which URLs have been associated to a specific category, over a determined period of time.

Although the web pages 440 on FIG. 4 have been represented as being part of the Internet 430, mobile Operators usually have their own web portal, which is hosted in the mobile data network 420. In this case, the categorization may be applied to both the Operator web portal, and to the Internet, or may focus on only one of these two.

Additionally, although FIG. 4 represents an embodiment of the present system in the context of a UMTS network, it can be applied to another type of mobile network, or to a fixed broadband network, as well. The main difference is the localization of the monitoring probe 450, which is located at a point of convergence for all the IP based data traffic.

Although the present method and system have been described in the foregoing specification by means of several non-restrictive illustrative embodiments, these illustrative embodiments can be modified at will without departing from the scope of the following claims.

The invention claimed is:

1. A method for categorizing URLs (Uniform Resource Locators) of web pages accessed by users over an IP (Internet Protocol) based data network, the method comprising:
   collecting by means of at least one monitoring probe real time data from IP data traffic occurring on the IP based data network;
   extracting from said collected real time data parameters related to a web page, said parameters including an URL of the web page;
   processing said URL with a rule based categorization engine, to associate a matching category to the URL of said web page, the matching category being inferred from a pre-defined list of categories;
   when no matching category is inferred, transferring said URL of said web page to a semantic based categorization engine; and
   processing said transferred URL by the semantic based categorization engine, said processing consisting in:
      extracting textual content from content of said web page associated to said URL,
      performing a semantic analysis of said textual content, and
      associating a matching category to the transferred URL of the web page based on the semantic analysis of the textual content extracted from the web page, the matching category being inferred from a pre-defined list of categories,
   wherein the URLs for which no matching category has been inferred by the rule based categorization engine over a determined period of time are memorized, wherein only the N URLs having the highest occurrence for which no matching category has been inferred by the rule based categorization engine over the determined period of time are transferred to the semantic based categorization engine, and wherein N is a pre-defined number of URLs.

2. The method of claim 1, wherein the processing of an URL by the rule based categorization engine to associate a matching category to the URL, relies on a set of text based rules defining a match between the URLs and the categories.

3. The method of claim 2, wherein the rule based categorization engine and the semantic based categorization engine use the same pre-defined list of categories.

4. The method of claim 3, wherein the matching category associated to a transferred URL by the semantic based categorization engine is transferred back to the rule based categorization engine, and the set of text based rules of the rule based categorization engine is automatically updated in order to acquire the capability to associate said matching category to said transferred URL.

5. The method of claim 1, wherein additional parameters related to an access to a web page are extracted from the collected real time data; said parameters including a timestamp of occurrence of the access to a web page, and an identifier of the user accessing the web page.

6. The method of claim 5, wherein an analysis from a Business Intelligence perspective of the matching categories associated to the URLs by the rule based categorization engine and the semantic based categorization engine is performed by an analytic system; said analysis taking into consideration the additional parameters extracted from the collected real time data.

7. The method of claim 6, wherein metrics are generated by the analytic system; said metrics including: total number of accesses to web pages which URLs have been associated to a specific category, over a determined period of time; total number of unique users accessing web pages which URLs have been associated to a specific category, over a determined period of time.

8. A system for categorizing URLs of web pages accessed by users over an IP based data network, the system comprising:
  at least one monitoring probe for collecting real time data from IP data traffic occurring on the IP based data network, and for extracting from said collected real time data parameters related to a web page, said parameters including an URL of the web page;
  a computer hardware processor for executing instructions implementing:
    a rule based categorization engine for processing said URL, to associate a matching category to the URL of said web page, the matching category being inferred from a pre-defined list of categories;
    a semantic based categorization engine for further processing said URL of said web page, when no matching category is inferred by the rule based categorization engine, the further processing consisting in:
      extracting textual content from content of said web page associated to said URL,
      performing a semantic analysis of said textual content, and
      associating a matching category to the URL of the web page, based on the semantic analysis of the textual content extracted from the web page, the matching category being inferred from a pre-defined list of categories,
    wherein the URLs for which no matching category has been inferred by the rule based categorization engine over a determined period of time are memorized, wherein only the N URLs having the highest occurrence for which no matching category has been inferred by the rule based categorization engine over the determined period of time are transferred to the semantic based categorization engine, and wherein N is a pre-defined number of URLs.

9. The system of claim 8, wherein the processing of an URL by the rule based categorization engine, to associate a matching category to the URL, relies on a set of text based rules defining a match between the URLs and the categories.

10. The system of claim 9, wherein the rule based categorization engine and the semantic based categorization engine use the same pre-defined list of categories.

11. The system of claim 10, wherein the matching category associated to an URL by the semantic based categorization engine, when no matching category has been inferred by the rule based categorization engine, is used to automatically update the set of text based rules of the rule based categorization engine, in order to acquire the capability to associate said matching category to said URL.

12. The system of claim 8, wherein the at least one monitoring probe extracts additional parameters related to an access to a web page from the collected real time data; said parameters including a timestamp of occurrence of the access to a web page, and an identifier of the user accessing the web page.

13. The system of claim 12, wherein an analytic system performs an analysis from a Business Intelligence perspective of the matching categories associated to the URLs by the rule based categorization engine and the semantic based categorization engine; said analysis taking into consideration the additional parameters extracted from the collected real time data.

14. The system of claim 13, wherein the analytic system generates metrics; said metrics including: total number of accesses to web pages which URLs have been associated to a specific category, over a determined period of time; total number of unique users accessing web pages which URLs have been associated to a specific category, over a determined period of time.

* * * * *